Feb. 12, 1952 M. WALLACE 2,585,605
NAVIGATIONAL SYSTEM
Filed Nov. 12, 1946 4 Sheets-Sheet 1

FIG. 1

Inventor
MARCEL WALLACE
By Hyman Hurvitz
Attorney

Feb. 12, 1952 M. WALLACE 2,585,605
NAVIGATIONAL SYSTEM
Filed Nov. 12, 1946 4 Sheets-Sheet 3

*Inventor*
MARCEL WALLACE
By
*Attorney*

UNITED STATES PATENT OFFICE 2,585,605

NAVIGATIONAL SYSTEM

Marcel Wallace, Fairfield County, Conn., assignor, by mesne assignments, of one-half to said Wallace, doing business as Panoramic Laboratories, East Port Chester, Conn.

Application November 12, 1946, Serial No. 709,338

47 Claims. (Cl. 343—112)

This application is a continuation in part of my co-pending applications for U. S. Patent, Serial No. 588,395 and Serial No. 588,396, filed April 14, 1945, and entitled Radio Altimeter and Panoramic Reception System, now Patent Nos. 2,534,839 and 2,534,840, respectively, issued December 19, 1950. Applications Serial Nos. 588,395 and 588,396 are themselves divisional applications of a parent application identified as Serial No. 357,814, filed September 21, 1940, and which has now issued as Patent No. 2,378,604, dated June 19, 1945, the latter patent being a continuation in part of my co-pending application, Serial No. 330,763, filed April 20, 1940, and now Patent No. 2,312,203.

The invention herein disclosed relates generally to systems and methods of communication and more particularly to systems and methods of communication by radio which have application to navigational problems.

In my Patent No. 2,378,604, I have disclosed systems for indicating aboard each of a plurality of mobile craft, such as aircraft, certain navigational parameters associated with said craft, as well as like parameters associated with a plurality of adjacent craft. In particular, I have disclosed a system for indicating aboard each of a plurality of aircraft the elevation of each aircraft and the relative elevations of the remainder of a plurality of aircraft. This system utilizes transmitters carried aboard each of the craft, the frequency of each transmitter being caused to vary in accordance with the elevation of the aircraft, and each of the craft carrying a panoramic receiver capable of simultaneously indicating the frequency of the transmitters from the various craft. By means of this system, pilots in the various craft are enabled to read on the face of the cathode-ray indicator associated with the panoramic receiver the relative altitudes of all other aircraft within receiving range and which are suitably equipped.

Experience has demonstrated that the pilot of a modern aircraft is required to direct his attention to so many instruments of various characters that he is unwilling to be burdened with a further instrument which requires him to analyze a continuously varying panorama of indications on the screen of a cathode ray tube indicator in order to determine relative elevations of aircraft in his vicinity. It would appear that the task of a pilot could be materially simplified if he were to rely upon indications or communications transmitted to him by a ground observer who maintains continuous watch over the particular craft's movements, as well as over the movements of other craft in the vicinity and over obstacles to air navigation. The ground observer, having no flying duties, is enabled to devote his entire attention to the task of correlating the locations of aircraft and obstacles, and is best able to judge of the wisdom or necessity for particular maneuvers on the part of any particular aircraft.

In accordance with the present invention, I propose to utilize a predetermined band of frequencies exclusively for elevation indications which may be automatically transmitted from each aircraft either continuously or when in the vicinity of an airport. A further band of frequencies having a width equal to that of the first mentioned band may be used for transmitting orders, commands or information to any selected aircraft from the ground. Each aircraft may be equipped with a receiver for receiving such orders, commands or information, and said receiver may be tuned to a frequency which is maintained automatically at all times at a constant frequency separation from the frequency of the elevation transmitting equipment. The ground observer may observe on the face of a cathode-ray tube indicator, which forms a part of a panoramic receiver, transmissions from a plurality of craft in his vicinity and may determine the elevations of each of the craft. Should he desire to communicate with any one of the craft, he may tune a communication transmitter to a frequency of the receiver aboard that craft. Since, as has been stated previously, the aircraft receiver is automatically maintained tuned in accordance with the elevation of the craft, only aircraft at or adjacent to the elevation corresponding with the tuning of the ground transmitter are able to receive communications, all aircraft at substantially greater or lesser elevations receiving no signals.

It is quite normal for aircraft to vary their elevations to a considerable degree even while flying at what is normally considered a fixed altitude and this occurs particularly in the course of making turns and similar maneuvers. It is, accordingly, desirable to provide at the ground transmitter some means of maintaining the frequency of the ground transmitter locked to the frequency transmitted by the aircraft with which it is desired to communicate, in order to avoid loss of signals at the aircraft due to changes of elevation, which may be of relatively sudden occurrence and which may, consequently, remain unnoticed by the ground operator and in order further, to reduce the total burden of the ground operator in maintaining a communication channel, as well as for other purposes, which will appear in due course.

Tuning of the ground transmitter may be accomplished manually, if desired, and in accordance with one preferred embodiment of my invention, once the transmitter has been manually tuned to accomplish communications with any aircraft flying at a predetermined elevation, elevation representative transmissions emanating from that craft may be utilised to control automatically the frequency of the ground transmitter to maintain it always capable of communicating with that aircraft in spite of changes in the altitude of the aircraft.

Transmissions from the aircraft at frequencies corresponding with elevation may be modulated, if desired, in such manner as to identify the aircraft from which the transmissions emanate. The ground transmitters may be modulated to enable exchange of verbal information or commands, or may be automatically modulated by one or more characteristic modulations to indicate certain types of frequently utilized commands or information. Characteristic modulations, when received aboard the aircraft, may be utilized to energize colored lamps or other types of visual indicators which may be readily observable and easily understood by the pilot.

Once a selective channel of communication between ground and a particular aircraft has been created, that channel may be utilized for various purposes in addition to the transmission of aural signals. In particular the channel may be utilized for transmitting signals from the ground to the aircraft, in the form of deviations of the normal steady value of the transmitted carrier, these deviations constituting spot commands which may be interpreted aboard the aircraft in terms of deviations of the pointer of a meter.

The spot command function is performed by varying the ground frequency to have a value slightly above or below the value to which the receiver of the commanded aircraft is tuned, to indicate a desired increase or decrease of aircraft elevation. Aboard the aircraft a frequency discriminator which controls a horizontal pointer of a crossed pointer meter, indicates to the pilot the value of the frequency deviation, by rising or dipping, to indicate the character of the desired maneuver.

The spot command function may be extended to set up a plurality of glide paths, having any desired configurations, and which may be selectively set into the system by the ground personnel to suit particular aircraft or types of aircraft. The glide paths are set up in terms of a predetermined law of variation of the ground frequency, this frequency being translated in terms of desired changes in altitude by the spot command meter aboard the aircraft.

The transmission channel may further be utilized for the purpose of transmitting from the ground station to the aircraft modulation signals indicative of the lateral deviation of the aircraft from a predetermined course. At the ground station the modulation signals may be produced automatically under the control of a direction finder system which is maintained tuned to the transmissions from a selected aircraft. Aboard the aircraft the modulation signals are translated in terms of lateral deviations of a vertical pointer of the crossed pointer meter previously referred to.

Since each aircraft utilizing the present system carries a receiver which is maintained tuned to an altitude corresponding frequency the receiver may be utilized as part of an obstacle detection system. Ground transmitter stations may be provided at or adjacent to obstacles which transmit continuously a carrier which is frequency modulated at a convenient characteristic rate between a frequency corresponding with ground elevation, and a frequency corresponding with the elevation of the obstacle plus a clearance factor of say 200 ft. Aircraft equipped with altitude tuned receivers will receive the transmitted signals only if they are below the elevation corresponding with the maximum transmitted frequency. In the latter case the characteristic rate of modulation will be evidenced as a signal at the output of the aircraft receiver having the frequency of the characteristic rate of modulation, and may be caused to energize a suitable indicator to apprise the pilot of his danger, thereby enabling him to increase his elevation until the indicator becomes de-energized. If desired a directional receiving antenna system may be employed aboard the aircraft, which may provide a relatively narrow beam ahead of the craft, so that the pilot of the craft may be enabled to determine whether or not the indicated obstacle is directly in his path.

It is, accordingly, an object of the invention to provide a system of selective communication between stations.

It is a more particular object of the invention to provide a system of selective communication between two or more stations, wherein selection is accomplished in accordance with a navigational parameter associated with one of the stations.

It is another object of the invention to provide a system of selective communication between a ground station and aircraft located at a predetermined selectable elevation.

It is still another object of the invention to provide receiving systems which are automatically tunable in accordance with a navigational parameter of an aircraft.

It is another object of the invention to provide automatic frequency control systems for transmitters to enable such transmitters to remain tuned in fixed relation to a continuously varying signal.

It is still another object of the invention to provide a system of duplex communication wherein a variable frequency control signal maintains frequency control of an associated receiver and a transmitter, the receiver and the transmitter being maintained at a constant difference of frequencies.

It is another object of the invention to provide a system of selective communication between a ground station and aircraft selected in accordance with a navigational parameter, such as altitude, communication, once established, being maintained automatically despite changes in the navigational parameter.

It is still another object of the invention to provide a system of communication for providing spot commands to selected aircraft to the exclusion of other aircraft in the same vicinity.

It is a further object of the invention to provide a system for communicating spot commands to selected aircraft by varying slightly the frequency of a carrier utilized concurrently, if desired, for the transmission of aural signals, and wherein the spot commands may be visually interpretable aboard aircraft in terms of deviations of the pointer of a meter.

It is still another object of the invention to provide a novel system of glide paths for assisting aircraft in making blind landings.

It is a further object of the invention to provide one or more selectively operatable glide paths, each having a different predetermined configuration, and which may be utilized in conjunction with altitude tuned radio receivers aboard aircraft for guiding the aircraft in blind landings, the glide paths being set up in terms of predetermined laws of variation of ground station originating transmission frequencies. Deviations from a predetermined glide path may be indicated aboard an aircraft in terms of deflections of a pointer of a spot command meter.

It is still a further object of the invention to provide a novel system of lateral control of aircraft, and which has particular application to lateral control of aircraft during a blind landing operation.

It is a further object of the invention to provide an obstacle detection system for aircraft, the system being operable to provide an indication aboard any one of a plurality of aircraft which is flying below a predetermined altitude.

It is still a further object of the invention to provide an obstacle detection system for aircraft wherein a ground transmitter located at or adjacent to an obstacle transmits a barrage of signals, each signal of the barrage corresponding in respect to frequency with an unsafe altitude, and the aircraft being provided with a receiver tuned to receive signals only at frequencies corresponding with the altitude of the aircraft.

The above and still further object and advantages of the invention will become apparent upon study of the following detailed description of a specific embodiment of the invention, taken in conjunction with the accompanying drawings wherein.

Figure 1:
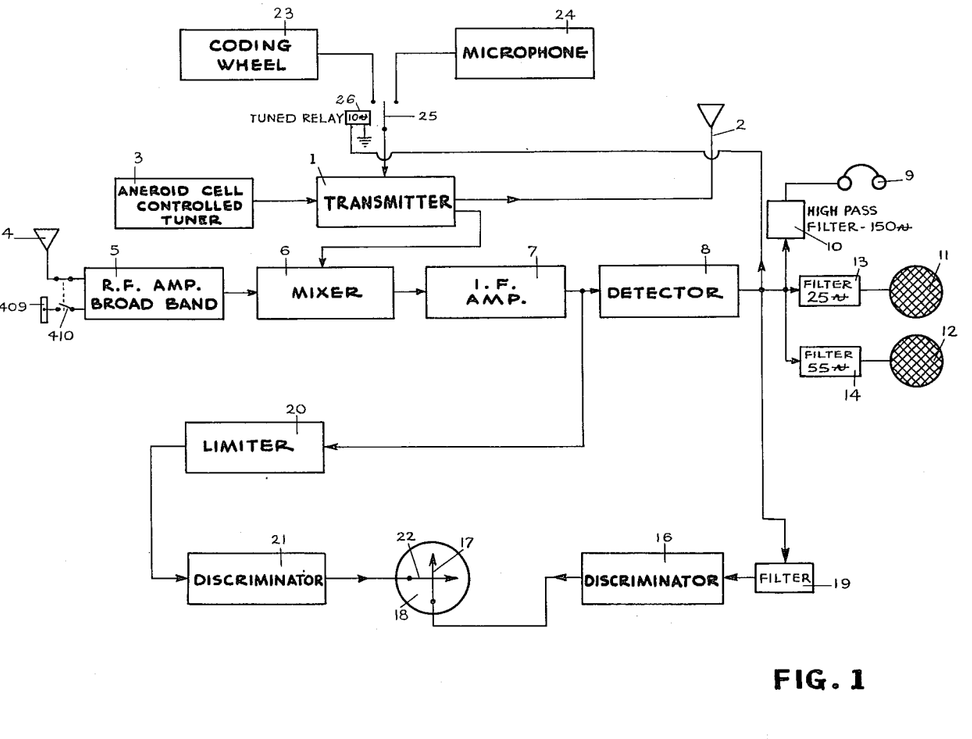
Figure 1 is a functional block diagram of equipments required, in whole or in part, aboard each of a plurality of aircraft, in connection with the practice of the invention.

Referring now specifically to the drawings, and particularly to Figure 1 thereof, there is disclosed a functional block diagram of the equipment carried aboard each of the aircraft which utilize the system of the invention. The reference numeral 1 refers to a tunable transmitter, having an omnidirectional antenna 2, and which is controlled in respect to frequency by an altitude measuring instrument 3 which in the presently described embodiment of the invention may be an aneroid cell arranged to vary a frequency determining condenser associated with the transmitter 1 in accordance with local atmospheric pressure. Transmitters of the character indicated are now well known in the art, and have been described in Patent No. 2,378,604, issued to Marcel Wallace, June 19, 1945, and, for that reason, need not be further described here. It will of course be evident that the transmitter 1 may be controlled in frequency by an absolute altimeter, if desired.

Associated with the transmitter 1, aboard each aircraft, is a receiver which tracks with the transmitter 1, by reason of an electrical interconnection therewith, maintaining itself at a fixed frequency difference from the transmitter at all times.

The receiver referred to in the previous paragraph consists of an omni-directional antenna 4, connected to the input of a broad band R. F. amplifier 5 capable of accepting without undue attenuation any frequency in the band of frequencies allocated to the aircraft receiving function. The output of the amplifier 5 may be applied to a mixer 6, which is supplied with local oscillations from the transmitter 1, the difference frequency being applied to an I. F. channel 7 having variable selectivity, and which is tuned to a center frequency corresponding with the desired difference frequency between the transmit and receive frequencies.

In one practical embodiment of my invention, I have assigned to the transmitter 1 a band of frequencies 148–153 mc. corresponding with a range of altitudes from 0 to 10,000 ft., the receiver then occupying a band of frequencies 153–158 mc. for the same range of altitudes, and the I. F. amplifier 7 being tuned to have a center frequency of 5 mc. It will be realized that I am not limited to the above mentioned altitude ranges, nor to the above portions of the frequency spectrum, the invention being adapted for use at far greater altitudes, and in any portion of the available radio frequency spectrum.

Connected to the output of the I. F. amplifier 7 is a detector 8, for deriving from received carrier signals modulation frequencies impressed thereon. At the output of the detector 8 may be connected a pair of phones, or other aural output indicator, 9, the connection being made via a high pass filter 10 having a cut-off frequency at about 150 cycles, frequencies below 150 cycles being utilized to control indicators of various character. In particular, I may connect in parallel to the output of the detector 8, a pair of signal lamps 11 and 12, of different colors respectively, and between which and the detector 8 are interposed filters 13 and 14, respectively associated with the lamps 11 and 12. The filter 13 may be tuned to a frequency of 25, and the filter 14 to 55 cycles per second, these frequencies being, however, selectable at will, so that the lamps 13 and 14 may be energized by transmission from the ground of suitable control signals. It will be obvious, of course, that more than two lamps may be employed, if desired.

Further connected to the output of the detector 8 is a discriminator 16, the latter serving to provide a D. C. output signal to the vertical pointer 17 of a crossed-pointer meter 18, the said output signal having a magnitude and polarity which provides a measure of comparison between the values of a pair of associated modulation signals, say at frequencies of 90 and 125 cycles, and which are derived from the ground as a measure of the lateral deviation of the aircraft from a predetermined course. In order to avoid confusion at the discriminator 16 between control signals at frequencies of 25 cycles per second and 55 cycles per second, which are intended as lamp control frequencies, and audio signals and frequencies of 90 cycles per second and 125 cycles per second and which are intended as lateral deviation pointer control frequencies, I may interpose prior to the discriminator 16 a band pass-filter 19 suitable for passing frequencies from about 75 cycles per second to 150 cycles per second, or alternatively the discriminator 16 may be designed to be practically unresponsive to frequencies other than 90 and 125 cycles. Discriminators of this character are well known in the art, and need not therefore be described in detail.

Connected to the output of the amplifier 7, and antecedent to the detector 8, is a limiter 20 and a following discriminator 21, the latter being tuned to a center frequency corresponding with the center frequency of the I. F. amplifier 7 and suitable for measuring deviations in the frequency values of received carriers, such deviations being applied to cause deflections of a horizontal pointer 22 of meter 18, to measure the sense and magnitude of the said deviations in frequency.

The airborne transmitter 1 may be modulated as desired, by a coding wheel 23 or by a microphone 24, in accordance with the position of a selector switch 25, the coding wheel aboard each craft carrying peripheral markings identificatory of that craft.

The selector switch 25 may be manually controllable by personnel aboard the aircraft, if desired, but for some purposes it is desirable to enable the plane to be automatically interrogated from the ground, the coding wheel 23 being connected via switch 25 to the transmitter 1 in response to suitable ground originating signals.

To accomplish the above purpose a relay 26 is placed in actuating relation to the switch arm of the switch 25, the relay 26 being tuned to some low modulation frequency not otherwise utilized in the system, say 10 cycles per second, and connected to the output of the detector 8. Thereupon, whenever the ground station personnel desire to obtain the identifying code associated with any specific craft, it is necessary only to tune the ground transmitter receiver to the altitude corresponding frequency of that craft, and to energize a 10 cycles per second modulation generator.

The relay 26 aboard the selected aircraft will be then energized and will cause transmission to the ground station of coded signals identificatory of the selected aircraft, by connecting to the transmitter 1 the code wheel 23. These signals may be interpreted at the ground station either aurally, or visually.

Ground equipment

Figure 2:
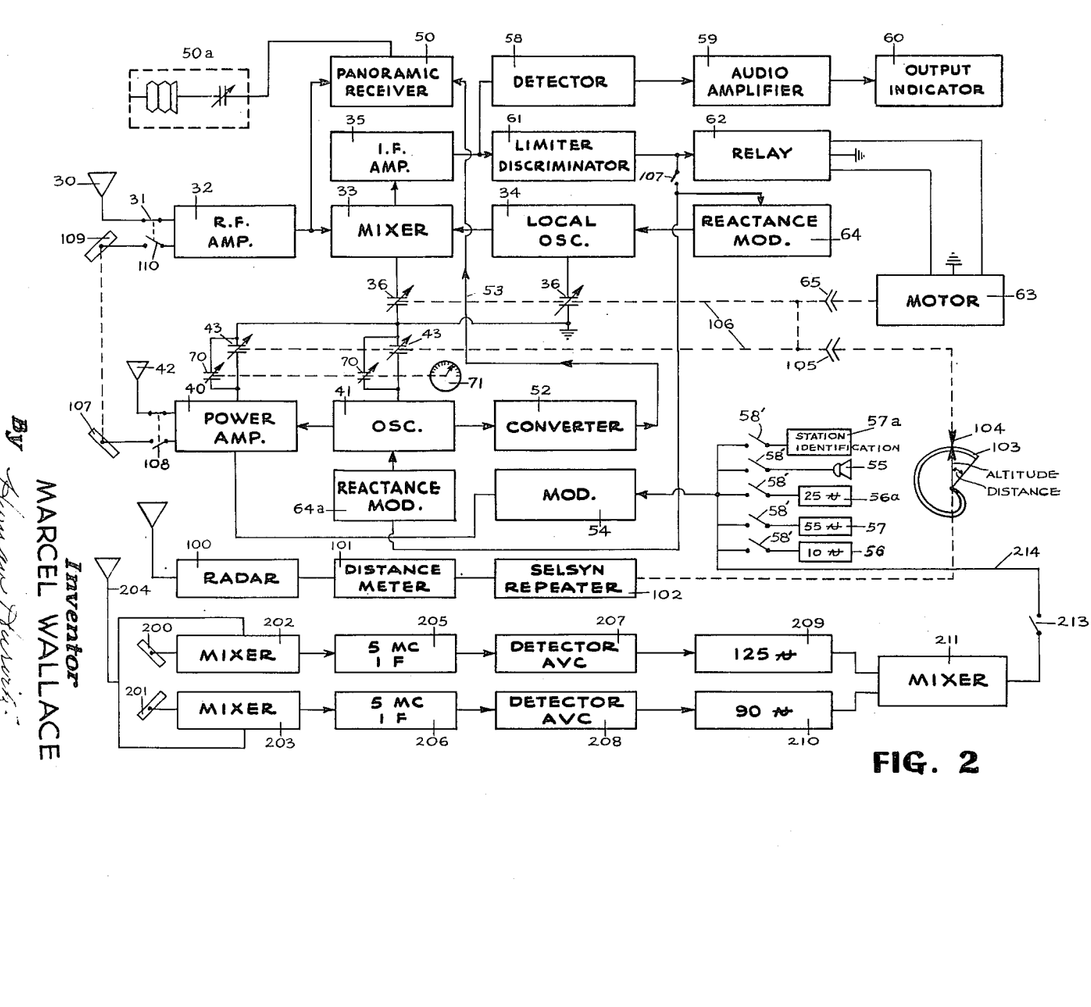
Figure 2 is a functional block diagram of ground equipments required, in whole or in part, in connection with the practice of the invention.

Proceeding now with a description of the equipment at a ground station arranged in accordance with the present invention, reference is made to Figure 2 of the drawings. In that figure the reference numeral 30 denotes an omnidirectional antenna which may be coupled, by means of a switch 31, to an R. F. amplifier 32 which is designed to be of sufficiently broad band to translate signals within the band of frequencies 148–153 mc. allocated to the airborne transmitters. The output of the amplifier 32 is coupled to a mixer 33 which is supplied with local oscillations by a suitable source 34, the output of the mixer 33 being applied to an I. F. amplifier 35. The mixer 33 and the local oscillator 34 may be gang tuned manually, or alternatively by automatic mechanisms, which will be described below, by adjustments applied to ganged tuning condensers 36.

The reference numeral 40 denotes a power amplifier of a transmitter comprising further an oscillator 41 which feeds signals to the amplifier 40 to be amplified and applied to the omnidirectional antenna 42. The power amplifier 40 and the oscillator 41 are gang tuned by main tuning condensers 43, which are ganged with the condensers 36, and which are designed to maintain a constant frequency difference of 5 mc. between the transmitter and receiver of the ground station, the ground receiver being thus adjusted to receive signals from a selected aircraft only when the aircraft receiver is likewise adjusted to receive signals from the ground transmitter.

Connected to the output of the R. F. amplifier 32 is a panoramic receiver 50 of generally conventional character and which is adapted to display against a vertical axis on the face of a cathode ray indicator associated with the receiver, signals received from a plurality of aircraft transmitters 1, and which represent in terms of their frequencies the altitudes of the aircraft. The panoramic receiver 50 may be designed to scan the frequency band 148–153 mc. in the present specific application of the invention, and the associated cathode ray indicator may be calibrated in terms of thousands of feet, it being thus possible readily to determine, by study of the indicator, the altitudes of all aircraft adjacent to or within receiving range of the ground station.

In order that the panoramic receiver 50 shall be capable of accurate indication of altitude under all conditions of ambient atmospheric pressure, and considering that in the present system, the measurements of altitude as transmitted from each aircraft may be provided in terms of local atmospheric pressure at the aircraft, the receiver 50 is provided with a correction device, in the form of an aneroid cell tuner 50A for controlling the overall tuning of the receiver 50 and which assures that the receiver 50 will provide a zero altitude indication in response to signals at a frequency corresponding with the ambient atmospheric pressure at the ground station. Devices for accomplishing this objective have been adequately described in connection with Figure 4 of Wallace Patent #2,378,604 and consequently require no extended treatment in the present specification.

Some of the output of the oscillator 41 is applied to a converter 52 which provides a frequency output decreased from that of the oscillator 41 by a constant factor of 5 mc. The output of the converter 52 thus corresponds with the tuned frequency of the mixer 33 and serves to indicate the frequency of the ground receiver, being applied for that purpose to the panoramic receiver 50, via lead 53, prefarebly in such sense as to produce a deflection of opposite sense to the deflections produced by the altitude representative signals.

It will be apparent, upon consideration of the arrangement above described, that ground personnel may provide a two-way communication channel between any selected aircraft and the ground station, to the exclusion of other aircraft (provided only that they are not at the same altitude as the selected aircraft) by tuning the condensers 43 until the ground originating pip on the panoramic receiver 50 matches the altitude representative pip deriving from the selected aircraft. Once the pips have been matched the ground transmitter is tuned to the frequency of the selected aircraft receiver, and the ground station receiver to the frequency of the selected aircraft transmitter.

The power amplifier 40 of the ground station transmitter may be modulated by application to the modulator 54 of signals derived from a microphone 55, a source of 10 cycles per second tone 56, a source of 25 cycle tone 56a, and a source of 55 cycles per second tone 57, selectively in any desired combination, selection being accomplished by switches 58'. Also connectible to the power amplifier 40, by means of a further switch 58', is a phonograph reproducer 57a which provides continuous verbal output indicative of the identification of the transmitting station. The ground station personnel may therefore carry on voice communication with the selected aircraft, and may further, or alternatively, control the signal lamps 11, 12 (Fig. 1) by application of signal deriving from sources 56a, 57 to the modulator 54. Verbal station identification may be automatically provided from the ground station for the benefit of aircraft in communication therewith, and the ground station may transmit 10 cycles per second tone to cause identificatory transmissions from any selected aircraft.

The I. F. amplifier 35 at the ground station receiver may be coupled to a suitable audio detector 58, an audio amplifier 59, and an aural output indicator 60, in cascade, to enable reception of coded or aural signals originating from the transmitter 1.

Since aircraft in flight normally do not retain fixed altitudes, it has been deemed desirable to provide an automatic frequency control system for the ground equipment to maintain the ground transmitter and receiver locked with the transmitter and receiver of a selected aircraft with which it is desired to communicate, thus to avoid failure of an established communication channel due to change of altitude of the selected aircraft, and to avoid the necessity for excessive monitoring of a communication channel once it has been established.

The output circuit of the I. F. amplifier 35 is accordingly coupled to a limiter-discriminator 61, tuned to the center frequency of the I. F. amplifier 35 and capable of translating any signal applied thereto from the amplifier 35 into a D. C. potential having a magnitude corresponding with the deviation of the applied signal from the center frequency of the amplifier, and a sense corresponding with the sense of the deviation.

The output of the limiter discriminator 61 is utilized to control a polarized relay 62, which in turn controls a reversible D. C. motor 63, the latter being mechanically coupled via a disengageable clutch 65 with the tuning condensers 36 and 43 which serve to tune the transmitter and receiver channels of the ground station equipment.

The action of the frequency control system comprising discriminator 61, relay 62 and motor 63 is well known per se, and requires no extended exposition in this specification. By means of this frequency control system the ground equipment is enabled to track a selected aircraft, and to maintain continuity of communication once the aircraft has been manually selected.

In order to minimize the required operating time of the motor 63, to compensate for hunting, and to increase the speed of frequency variation, it has been found advisable to include an auxiliary frequency control circuit which is purely electronic, and of a highly sensitive character, and which serves to supply frequency control of but a limited extent. The auxiliary frequency control circuit comprises a pair of reactance tube modulators 64 and 64a, connected respectively in the circuits of the oscillators 34 and 41, and supplied with control potential from the output of the limiter-discriminator 61.

Spot command

While the system and method of the present invention has one direct and important function in providing for communication between a ground station and a selected one of a plurality of aircraft, other extremely important functions in the field of radio aids to navigation are contemplated. In particular, the important function of issuing spot commands to a selected aircraft may be accomplished, directing the aircraft from one altitude to another in continuous fashion, and at any desired rate, without detracting materially from the simplicity of the overall system, and by means of visual signals of a particularly simple character.

At the ground station is provided a trimmer condenser 70 associated with each of the transmitter tuning condensers 43. The specific mode of association is a matter of choice, a parallel connection being shown in Fig. 2. The setting of the trimmer condensers 70 may be manually controlled, as by a knob 71, calibrated in terms of feet of altitude, and the maximum possible total variation of transmitter frequency, producible by variation of trimmers 70, being less than the band width of the aircraft receiver at minimum selectivity setting of the I. F. amplifier 7.

By means of the above described arrangement the frequency of the ground transmitter may be slightly de-tuned with respect to the frequency of the aircraft receiver, causing generation of a D. C. control potential at the output of discriminator 21, and a consequent dip or rise of the pointer 22, dependent on the sense of the adjustment of the spot command knob. The reading of the meter 18, as indicated by pointer 22, may be caused to correspond with the setting of the knob 71, indicating to the pilot a desired increase or decrease of altitude. As the pilot changes his altitude in response to the indication of the meter point 22, the A. F. C. system at the ground station maintains the altitude corresponding frequency separation between the ground station transmitter and the airborne receiver, despite the changes in altitude accomplished by the pilot, whereby he is constrained to continue the change until the knob 71 is reset to zero and the aircraft has arrived at the ultimately desired altitude.

Landing system

It is contemplated in presently planned installations for assisting in the control of aircraft adjacent to landing fields, that suitable radar equipments will be provided, capable of following an aircraft at close range and low altitude, and particularly during an approach and landing operation. In the present system a complete radar equipment suitable for performing the above function is represented by the block 100, which utilizes as an output device, in addition to the usual visual indicators, a distance indicating mechanical meter 101, the meter 101 being coupled in accordance with techniques well known per se, by means of a selsyn repeater 102, or other suitable device to control the angular position of a rotatable cam 103, having a configuration such that for each angular position thereof, corresponding with distance, the radius vector of the cam is proportional to a desired altitude of a glide path. The outline of the cam defines a glide path, accordingly, in miniature.

While I have disclosed a single cam 103, it will be realized that a plurality of such cams may be provided, each having a different configuration, and which may be mutually replaceable, in order to increase the flexibility of the present system and to provide a plurality of possible glide paths suited to the various sizes and types of aircraft which may require guidance in landing, and suited, further, to the character and length of the landing strip being utilized. Variation of the height of each point of any glide path may be accomplished by adjustment of the trimmer condensers 70, in response to actuation of control dial 71. Such variation does not, however, affect the curvature of the glide path, unless the control dial 71 is continually varied as the aircraft makes a landing.

Riding on the periphery of the cam 103 is a cam follower 104, which may be mechanically coupled via a clutch 105 with the ganging apparatus 106 (conventionally indicated) for condensers 36 and 43, the clutch 65 which normally serves to couple the motor 63 to the ganged condensers 36, 43 being then disconnected, disabling the A. F. C. motor system. A suitable switch 107 is provided in the lead which provides D. C. control voltage to the reactance modulators 64 and 64a, whereby to disable also the electronic A. F. C. system during a blind landing operation.

The transmitter 40 will, by reason of its tuning in response to the instant of time a signal at a frequency corresponding with the altitude which an aircraft in landing should have, at the range of that aircraft as determined by the radar equipment 100, and the distance meter 101. The airborne receiver is adjusted to have maximum channel width in I. F. amplifier 7 to assure that communication with the ground glide path transmitter will not be lost, in the absence of ground A. F. C. action, and is provided with spot command indications, by the pointer 22, indicating whether the aircraft must increase or decrease its altitude, at every point in its glide, to conform with the glide path provided by the ground transmitter.

Since a landing operation is usually conducted only in a preselected direction, along a landing strip, I provide a directional antenna 107 which may be utilized as a radiating element by the ground transmitter 40, in place of the omnidirectional antenna 42, by suitable manipulation of switch 108.

At the same time, if desired, directional antenna 109 may be coupled with the R. F. amplifier 32, in place of the omnidirectional antenna 30, by suitable manipulation of switch 110.

The panoramic receiver 50, in such case, with directional antennas 107 and 109 in use, will provide indications of the actual and desired altitudes of only the landing aircraft, and of aircraft adjacent thereto, for the information of the ground operator, who will be enabled to disable the glide path transmission and re-establish the communication channel, should he perceive the desirability of so doing, and proceed to guide the aircraft by verbal commands assisted by manipulation of the spot command dial 71.

*Lateral control*

In order effectually to guide an aircraft to a blind landing it is essential to provide not only a glide path, but also lateral control of the aircraft to maintain the aircraft in alignment with the landing strip.

In the present system, so long as an aircraft in process of landing is following with reasonable exactitude the glide path effectively established by the ground transmitter under control of the cam 103, a communication channel exists between the ground station and the aircraft. This channel may be utilized for determining the direction of approach of the aircraft and for conveying to the aircraft signals bearing a correspondence with the lateral deviations of the aircraft from a predetermined glide path. The latter signals are received aboard the craft which is being guided to a landing and are there interpreted in terms of lateral deflections of a vertical pointer of a spot command meter.

Referring particularly to Figure 2 of the drawings, the reference numerals 200 and 201 denote a pair of unidirectional receiving antennas arranged to provide crossed or overlapping radiation patterns, and which may, if desired, be oriented in line with a landing strip, the equipotential line associated with the overlapping pattern bi-secting the strip lengthwise. The signals received by the antennas 200, 201, accordingly, respectively bear a definite amplitude relation to the lateral deviation of the aircraft from the glide path.

Signals received by the antennas 200 and 201 are converted to an I. F. frequency of 5 mc. in a pair of mixers 202, 203, connected with the antennas 200, 201 respectively, and provided with local oscillations by means of a pick-up or probe 204, electro-magnetically coupled with the transmitting antennas 42 or 107, as the case may be.

The I. F. channels 205, 206 are designed to be of sufficient band width to accept the signals from a craft in course of landing despite the fact that the craft may not be at precisely the altitude predetermined for the range of the craft by the cam 103, i. e. that the craft is not exactly on the glide path provided therefor.

By reason of the fact that the local oscillations are supplied at the frequency of the oscillator 41, and that the I. F. channel is chosen to be 5 mc. a measure of selectivity is provided for the lateral deviation control circuits, rendering them unresponsive except to signals originating from aircraft which are in process of following the glide path.

The outputs of the I. F. channels 205, 206 are detected respectively in detectors 207, 208, which are each designed to produce an A. V. C. voltage corresponding in amplitude with the strength of the signal in the associated channel.

The A. V. C. output voltages provided by the detectors 207, 208 is applied to control the outputs of a pair of signal sources 209, 210, which generate frequencies of 90 and 125 cycles, respectively, the amplitudes of the signals being equal in the presence of equal A. V. C. voltages in the respective channels and bearing an amplitude ratio to each other which is equal to the amplitude ratios of the A. V. C. voltages, when the latter are unequal.

The outputs of the signal sources 209, 210 are applied to a mixing circuit 211, of linear character, and which serves to combine the signals without affecting their relative amplitudes. The output of the mixing circuit 211 is applied over a manual switch 213 and the lead 214 to the modulator 54, and is thence impressed on the carrier transmitted by the power amplifier 40.

An aircraft which is following a glide path provided by the system of the invention, and which is reasonably adjacent thereto, receives the carrier transmitted from the ground station, and which carries the lateral deviation indicating signals, and detects the carrier to remove the lateral deviation signals, which are then applied over filter 19 to the discriminator 16, which, as has been explained heretofore, provides a D. C. output signal having a sense and a magnitude corresponding with the relative value of the 90 cycles per second and 125 cycles per second lateral deviation signals. The output of the discriminator 16 is measured by the pointer 17 of the meter 18, which assumes a position corresponding with the lateral deviation of the aircraft from the desired path, thereby serving as a guide to the pilot of the aircraft in maneuvering to a landing.

*Anti-collision*

The present system of communication finds still further application to warning aircraft of the presence of obstacles in the path of the aircraft. This function of the system is accomplished by providing at or adjacent to obstacles a transmitter which continually radiates a frequency modulated carrier, the rate of modulation being at a characteristic rate of perhaps 500 or 1000 cycles, and the frequency excursion of the carrier extending from a frequency corresponding with ground elevation to a frequency slightly above that corresponding with the elevation of the obstacle. Thereby an aircraft equipped with a radio receiver tuned in accordance with the altitude of the aircraft will receive aural signals at the characteristic rate if and only if the altitude of the aircraft is below that of the obstacle.

Figure 3:
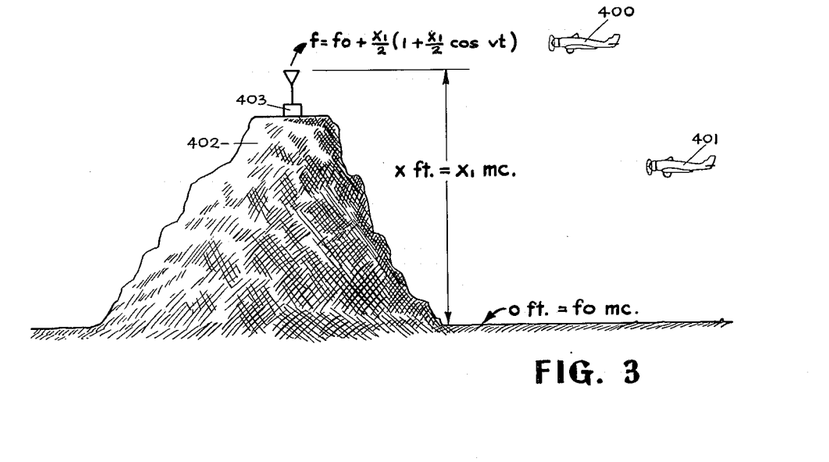
Figure 3 is a schematic diagram showing the relationship between aircraft and an obstacle guarded by a transmitter capable of setting up a barrage of frequencies corresponding with dangerous altitude in the vicinity of the obstacle.
Figure 4:
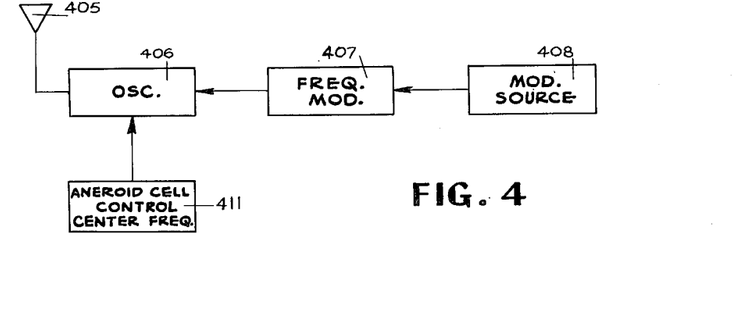
Figure 4 is a functional block diagram of the transmitter of Figure 3.

Reference is now made to Figure 3 of the drawings, wherein each of the aircraft 400 and 401 is assumed to be equipped with apparatus corresponding with that illustrated schematically in Figure 1 of the drawings. An obstacle 402 is shown, taking the character of a mountain, for purposes of exemplification, and at an elevated point of which is located a transmitter 403, a block circuit diagram of which is provided as Figure 4 of the drawings, and which consists of an antenna 405, an oscillator 406 coupled to the antenna 405, for imparting signals thereto, and controlled in respect to its mean frequency by an aneroid cell tuner 411, a frequency modulator 407 of any character, and a source of modulation 408 at a characteristic frequency $v$ and of an amplitude sufficient to produce a total carrier deviation from the unmodulated value $$+\frac{X_1}{2} \text{ mc.}$$

where $X_1$ is the frequency difference in mc. between the frequency corresponding with the clearance of the obstacle and the frequency $F_0$ corresponding with sea level. If, for example, a frequency band for ground transmission were utilized extending from 153 mc. to 158 mc., corresponding with altitudes from sea level to 10,000 ft., at standard ambient atmospheric pressure, the value of $X_1$ for an obstacle having a height requiring a clearance altitude of 5000 ft. would be 2½ mc. The transmitted carrier would be assigned a mean frequency of $$F_0 + \frac{X_1}{2}$$

where $F_0$ is a frequency corresponding with sea level elevation, and would be assigned a deviation of ±1.25 mc. The equation expressing the instantaneous value of the transmitted carrier is $$F = F_0 + \frac{X_1}{2}\left(1 + \frac{X_1}{2}\cos vt\right)$$

$v$ being the modulation frequency.

With the above arrangement an aircraft 401, having an altitude below that of the obstacle would receive signals at an audio rate $v$, and could only escape such signals by climbing to an altitude greater than the height of the obstacle. An aircraft 400, flying at an altitude greater than the height of the obstacle 402, would receive no warning signal.

In order that the pilot of an aircraft may determine whether signals originating at an obstacle are in the path of the craft, a directional antenna 409 may be provided aboard each aircraft of the system, providing a relatively narrow radiation pattern directly ahead of the craft. Upon receipt of a signal indicating the presence of a dangerous obstacle in the vicinity of his craft, the pilot of the craft need only actuate a switch 410 to disconnect the omnidirectional antenna 42 to connect the unidirectional antenna 409, whereupon loss of the warning signal will indicate that the obstacle, while at a dangerous level relative to the aircraft is not in its path and may be ignored.

It will be noted that the transmitter 403 is not controlled in accordance with altitude, and therefore it may be located at any point adjacent an obstacle, and need not be at the highest point thereof. Provision must be made, however, for transmission in all directions relative to the obstacle, which inherently acts as a shield for radiation so that were the transmitter 403 located adjacent the base of the obstacle 402, a plurality of such transmitters would be required at various points about said base.

Since the aircraft receivers are tuned in accordance with local atmospheric pressure, if the obstacle indicating transmitter 403 remained fixed tuned, the altitude indications aboard aircraft, such as 401, would be erroneous. By correcting the mean frequency of the oscillator 406 by means of an aneroid cell tuner 411 correction for measurements on the aircraft are inserted in the system, and the aircraft is provided with a true indication of its relation to the obstacle 402 regardless of local atmospheric pressures.

For example, let us assume that the atmospheric pressure adjacent to obstacle 402 is 2% above standard. The aircraft then measures an altitude 2% above its true altitude, since its instruments are calibrated for standard conditions. The pilot of the aircraft may then feel safe in the presence of a dangerous obstacle, were the obstacle transmitter not constrained likewise to raise its mean frequency by 2%, thus accompanying a fictitious 2% increase in aircraft altitude by a 2% fictitious increase in the altitude of the obstacle 402, as measured by the frequencies transmitted by the oscillator 406.

Figure 5:
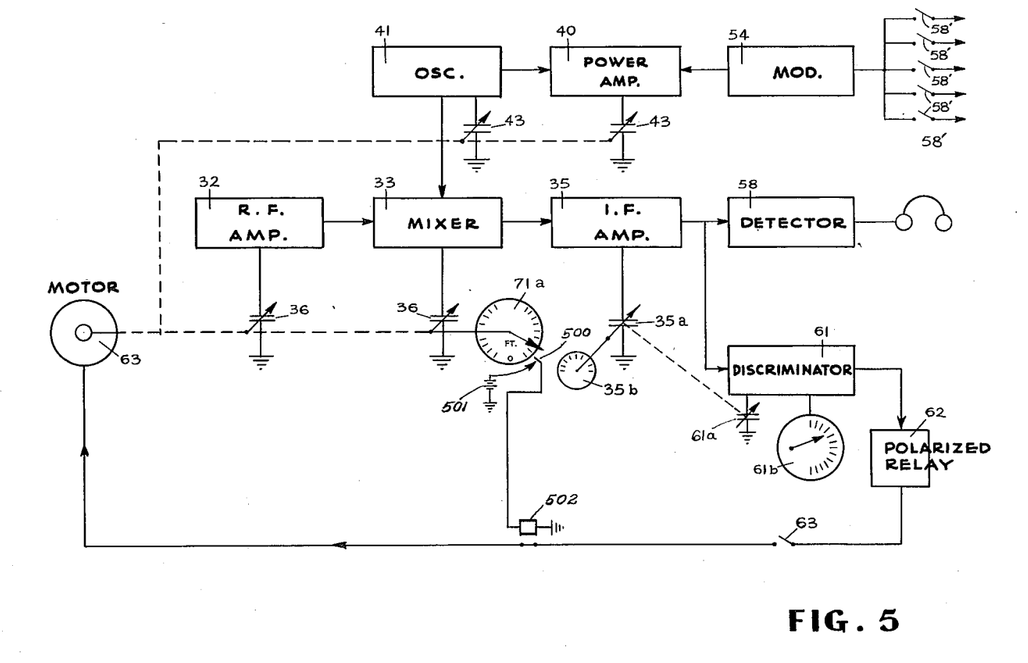
Figure 5 is a functional block diagram of a transmitter-receiver arrangement, having means for predetermining the relative tuning of the transmitter and of the receiver, and which may be utilized as part of the ground equipment illustrated in Figure 2 of the drawings.

Reference is now made to Figure 5 of the drawings, wherein is illustrated a possible modification of the system of Figure 2, and particularly disclosing a novel and advantageous relationship between the tunable receiver and transmitter of Figure 2, a single tunable oscillator being utilized, in the embodiment illustrated in Figure 5, to determine the frequency of a transmitter and the tuning of a receiver, while maintaining a fixed difference of frequency between the two. Since the apparatus of Figure 5 is intended to replace apparatus having a similar function in the embodiment of the invention illustrated in Figure 2, a complete system is not illustrated in Figure 5, but the relation between the embodiments of Figures 2 and 5 will be made evident as the description proceeds. Corresponding elements in Figures 2 and 5 respectively are denoted by the same reference numerals.

The embodiment of the invention which is illustrated in Figure 5 of the drawings includes an oscillator 41, a power amplifier 40 and a modulator 54, the latter being associated selectively, by means of switch 58, with modulation sources similar to those illustrated in Figure 2 and the purpose and function of which have been heretofore described. The oscillator 41 and the amplifier 40 may be tuned by means of tuning condensers 43, suitably associated therewith in a manner well understood per se, and the setting of which may be controlled manually as by a control knob 71a, calibrated in terms of altitudes or alternatively by means of a motor drive 63 which is controlled by a polarized relay 62, to cause rotation in either of two directions in accordance with the output of a discriminator and limiter 61.

The manual control knob 71a and the motor 63 serve not only to position condensers 43 associated with the transmitter of the system, but also to position simultaneously, and in ganged relation, condensers 36 which are adapted to tune the R. F. amplifier 32 and the mixer 33 of a receiver channel, maintaining the tuning of the receiver channel displaced five megacycles from the transmitted frequency, as in the system of Figure 2.

While in the system illustrated in Figure 2 the transmitter and receiver channels are each supplied with a separate oscillator, in the system of Figure 5 the transmitter oscillator 41 serves also as the local oscillator for the receiver channel, and desired frequency separations between the channels is maintained by the simple expedient of tuning the I. F. amplifier 35 to the desired frequency difference, which may have, in the illustrated embodiment, a nominal value of 5 mc. With the described arrangement the receiver channel is rendered capable of receiving only signals at a frequency bearing the desired relationship to or frequency difference from the transmitted signals.

The I. F. amplifier 35, which in the embodiment of Figure 2 of the drawings is fixed tuned, is in the embodiment of Figure 5 tunable by means of manually controllable tuning condenser 35a having a control knob 35b. Likewise the discriminator 61, which in the embodiment of Figure 2 is fixed tuned, is tunable in the embodiment of Figure 5 by means of a condenser 61a ganged with the condenser 35a, so that the center frequency of the I. F. amplifier 35 and of the discriminator 61 are at all times in alignment.

When the I. F. amplifier 35 and the discriminator 61 are tuned to a frequency of 5 mc., corresponding to their nominal and usual tuning, the receiver and transmitter channels are separated in respect to tuning by 5 mc. Any variation of the tuning of the amplifier 35 and of the discriminator 61 is accompanied by a like variation of the relative tuning of the ground receiver and transmitter channels. Since the receiver channel is maintained tuned to the frequency of a selected aircraft transmitter, in accordance with the altitude of the selected aircraft, by the action of the discriminator 61, the consequence of changing the frequency of the I. F. channel 35 and of the discriminator 61 is that the ground oscillator 41, and consequently the ground transmitter channel, changes its frequency.

Detuning of the amplifier 35 and of the discriminator 61 then accomplishes the same function as is provided for in the embodiment of Figure 2 of the drawings by variation of the trimmer condensers 70, i. e. detuning of the ground transmitter with respect to the altitude tuned receiver of a selected aircraft, and the consequent communication of spot command signals to the aircraft, which may be there interpreted in terms of deflections of the pointer 22 of the meter 18.

A meter 61b may be connected with the discriminator 61, which indicates the character of deviations of incoming signals from the tuned center frequency of the discriminator 61, and thereby the deviation of the altitude of a selected aircraft from the altitude frequency of the ground receiver channel.

If we assume that the motor 63 and its control circuits, including relay 62, operate with far greater rapidity in tuning the ground equipment then can be compensated for by changes in aircraft altitude, any change in the tuned frequency of the I. F. amplifier 35 and of the discriminator 61 cannot ever be quite compensated for by a change in aircraft altitude, and the aircraft spot command pointer 22 will continue, despite actual changes in aircraft altitudes, to indicate a desired change in altitude corresponding to the frequency variation from the nominal value in the tuned frequency of the amplifier 35 and the discriminator 61 until such time as the amplifier 35 and the discriminator 61 are retuned to that nominal value.

This point may be best clarified by an example, in the course of which reference will be made to the altitude frequencies of the various tunable devices of the system, it being understood that definite one-to-one correspondences exist between altitudes and frequencies in the present system.

If we assume now that an aircraft is transmitting an altitude frequency of 150 mc., and receiving on an altitude frequency of 155 mc., and if we assume the ground receiver I. F. discriminator channel to be tuned to 5 mc. the ground transmitter will operate at 155 mc., the ground receiver at 150 mc. and the meter indicators 22 and 61b will read zero.

If now the I. F. discriminator channel on the ground be tuned to 5.01 mc. a D. C. voltage will be generated in the discriminator 61 corresponding to a frequency deviation of .01 mc. which will, with extreme rapidity, retune the oscillator 41 to 155.01 mc., the aircraft transmitter and receiver remaining unchanged in frequency.

The meter 61b will now read zero, since the discriminator 61 is tuned to 5.01 mc. and is supplied with signal at 5.01 mc., resulting from mixing of the frequency of oscillator 41 at 155.01 mc. with the frequency of the aircraft transmitter at 150 mc. The meter pointer 22 aboard the aircraft, however, deflects since it is subjected to a voltage corresponding with a frequency deviation of .01 mc., the aircraft receiver local oscillator being at 150 mc. and the received signals at 155.1, discriminator 21 being tuned to a frequency of 5 mc.

When the pilot attempts to overcome the deviation of the pointer 22 by changing his altitude the change in altitude frequency transmitted by the aircraft is reflected as a discriminator output voltage at the ground equipment which retunes the ground oscillator 41, and since the oscillator 41 is retuned at a far greater rate than the pilot can overtake by altitude changes the difference of frequency between the ground transmitter and the airborne receiver is maintained, and this difference is continuously measured and indicated by the discriminator 21 and its associated pointer 22.

The pilot, accordingly, is constrained to follow the setting of the knob 35b, which may be calibrated in feet, until such time as the ground operator resets the knob 35b to zero, at which time the pilot is able to overcome the deflection of pointer 22 by a further relatively slight altitude change, bringing the pointer 22 to a reading of zero.

Should the motor 63 be disabled, as by opening its control circuit by means of switch 63', spot commands may nevertheless be communicated to the pilot of a selected aircraft by movement of the dial 71a gradually from a setting corresponding with the altitude of the aircraft, and to a setting corresponding with a desired altitude. Great care must be taken by ground personnel, in accomplishing the spot command function in this manner, to keep the transmitted altitude frequency of the ground equipment but slightly ahead of the actual altitude frequency of the aircraft receiver, in order to avoid losing contact with the aircraft.

Since the dial 71a indicates actual altitude of a selected aircraft, at all times, and since with the A. F. C. system of Figure 5 in operation a continuously operated spot command may be transmitted to the selected aircraft, requiring a continuous change in altitude on the part of that aircraft it would appear that in the event a ground operator sets a spot command into the knob 35a and is then distracted so that he neglects for a short time to monitor the actual altitude of the commanded aircraft, that aircraft may arrive at an altitude which is dangerous, by following the spot command meter, and that, therefore, the functions of the dials 71a and 35b should be combined in such manner as to avoid the possibility of an aircraft overshooting an intended altitude by reason of momentary inattention of the ground operator.

For this purpose I provide a limit switch 500 adjacent the dial 71a, which may be selectively positioned at any desired point adjacent the circumference of the dial 71a and which may be operated by the dial 71a when the latter attains a reading corresponding with the selected setting or position of the switch 500.

The switch 500, when operated may be arranged to complete a circuit from a battery or other source of electrical power 501 to a relay 502, which when energized, opens the control circuit of the motor 63.

By this simple expedient the ground operator may set up a desired altitude for a selected aircraft, by properly positioning the switch 500 with respect to the altitude calibrations of the dial 71a, and may then set a spot command into the dial 35b, secure in the knowledge that the commanded aircraft cannot exceed, as an ultimate altitude, the value determined by the setting of the switch 500, if the command involves an increase of altitude; and that the commanded aircraft cannot receive commands to further decrease altitude after arriving at the altitude determined by the setting of the switch 500, if the command involves a decrease of altitude.

While I have described and illustrated various specific embodiments of my invention, it will be clear to those skilled in the pertinent art that modifications in the general combination and in various of its details may be resorted to without departing from the spirit of the invention as defined by the appended claims.

What I claim and desire to secure by Letters Patent of the United States is:

1. A system of communication comprising a transmitter aboard an aircraft, a receiver aboard said aircraft, means for tuning said transmitter and receiver in accordance with the altitude of said aircraft, a ground transmitter, and means for maintaining the tuning of said ground transmitter at a frequency bearing a predetermined relation with the frequency of tuning of said receiver.

2. A spot command system comprising an aircraft receiver tuned in accordance with altitude, means for indicating deviations between the frequency of received signals and the tuning of said aircraft receiver, and means remote from said aircraft for providing spot command signals by transmitting signals having frequencies bearing a controllable relation with respect to the tuning of said receiver.

3. A communication system comprising an airborne transmitter, an airborne receiver, a ground transmitter, a ground receiver, means maintaining a fixed frequency difference between the tuning of said ground transmitter and receiver, means maintaining a like fixed frequency difference between the tuning of said airborne receiver and transmitter, and means for synchronizing the tuning of said ground transmitter with said airborne receiver, and of said airborne transmitter with said ground receiver.

4. Apparatus for establishing a radio glide path comprising a tunable transmitter, and means for establishing a predetermined law of variation of the tuning of said transmitter, said law bearing a fixed relation with a desired path of an aircraft in landing.

5. A method of guiding an aircraft to a landing comprising transmitting, for each distance of the said aircraft from a predetermined location, a frequency corresponding with a desired altitude of said aircraft.

6. A navigational system comprising a rotatable cam having a law of variation of radius vector with respect to angular position which bears a correspondence with a variation of position with respect to altitude of points on a glide path, means for angularily positioning said cam in accordance with distance of an aircraft from a fixed point, a radio transmitter, and means for adjusting the frequency of said transmitter in accordance with the radius vector of said cam.

7. A navigational system for aircraft comprising a receiver tuned in accordance with the altitude of said aircraft, an output circuit for said receiver comprising a frequency discriminator circuit and an output indicator for indicating the output of said frequency discriminator circuit, and transmitter means located remotely from said aircraft for transmitting signals controllable in frequency within the acceptance band of said frequency discriminator circuit.

8. A system of communication comprising an airborne receiver tunable only in accordance with a navigational parameter of aircraft, aural output means connected to said receiver, means for transmitting signals at frequencies defining a glide path, and means connected with said receiver for indicating the relation of the tuning of said receiver to said frequencies defining said glide path.

9. A system in accordance with claim 8 and further comprising means for transmitting signals defining lateral deviation of said aircraft from a predetermined line of flight, and means connected with said receiver and responsive to said last named signals for indicating the relation of said aircraft to said predetermined line of flight.

10. In combination, a superheterodyne receiver for radio signals comprising a mixer and an intermediate frequency channel, a transmitter automatically tunable in accordance with the value of a navigational parameter, means for applying a signal derived from said transmitter to said mixer for converting said radio signals to a frequency adapted for translation by said channel, whereby said receiver is adapted to receive only signals bearing a fixed difference frequency from the output frequency of said transmitter.

11. A system of communication comprising a transmitter aboard an aircraft, a receiver aboard said aircraft, means for tuning said transmitter and receiver in accordance with the altitude of said aircraft, a ground transmitter, and means for tuning said ground transmitter to a frequency bearing a predetermined relation with the frequency of tuning of said receiver, said transmitter aboard said aircraft and said receiver aboard said aircraft being tuned to a fixed difference of frequency.

12. A system of communication comprising a transmitter aboard an aircraft, a receiver aboard said aircraft, means for tuning said transmitter and receiver in accordance with the altitude of said aircraft, a ground transmitter, and means for tuning said ground transmitter to a frequency bearing a predetermined relation with the frequency of tuning of said receiver, and means associated with said ground transmitter for providing a continuous indication of the frequency relation between said frequency of transmission of said ground transmitter and said tuning of said receiver aboard said aircraft.

13. A system of communication comprising a tunable transmitter aboard an aircraft, a tunable receiver aboard said aircraft, means for tuning said transmitter and receiver in accordance with the altitude of said aircraft, a ground transmitter, means for tuning said ground transmitter to a frequency bearing a predetermined relation with the frequency of tuning of said receiver, and means for automatically maintaining said ground transmitter tuned in fixed relation with respect to the frequency of said receiver aboard said aircraft during variations of altitude of said aircraft.

14. A system of communication comprising a transmitter aboard an aircraft flying at variable altitude, a receiver aboard said aircraft, means for maintaining tuning of said transmitter and receiver in accordance with the altitude of said aircraft, a ground transmitter, and means for maintaining the tuning of said ground transmitter at a frequency bearing a predetermined relation with the frequency of tuning of said receiver, means for at will varying the said predetermined relation between the frequency of said ground transmitter and of the tuning of said receiver aboard an aircraft, and for automatically thereafter maintaining the varied predetermined relation between said ground transmitter and said receiver aboard said aircraft.

15. In combination, a transmitter for transmitting radio frequency signals, means for frequency modulating said radio frequency signals in accordance with a time law of frequency variation expressed mathematically by the law $$f = f_0 + \frac{x}{2}\left(1 + \frac{x}{2} \cos vt\right)$$

where $f_0$ is the mean frequency of said signals, $x$ is a number proportional to a predetermined measurable quantity, $v$ is an arbitrarily selected number, $t$ is a time parameter, and $f$ is the transmitted frequency.

16. A detection system for an obstacle to flight of aircraft, said obstacle having a predetermined altitude, comprising, a receiver mounted in an aircraft, means for tuning said receiver in accordance with the altitude of said aircraft, a transmitter of radio frequency oscillations located adjacent said obstacle, and means for effecting periodic frequency deviations of said radio frequency oscillations having a magnitude selected in accordance with altitude of said obstacle.

17. In combination, a radio receiver, means for tuning said receiver within a range of frequencies each of which corresponds with a value of a quantity, a transmitter for transmitting radio frequency signals, and means for effecting recurrent frequency excursions of said radio frequency signals between predetermined limiting values of said frequency within said range of frequencies, said limiting values of frequency being selected in accordance with two values of said quantity.

18. In combination, a radio receiver, means for tuning said receiver within a range of frequencies each of which corresponds with a value of a quantity, and transmitting means for transmitting radio frequency signals simultaneously over a band of frequencies within said range of frequencies corresponding with a predetermined range of values of said quantity.

19. A system of communication comprising a transmitter aboard an aircraft, a receiver aboard said aircraft, means for tuning said transmitter and receiver to frequencies having a fixed frequency difference and for selecting said frequencies in accordance with a value of a navigational parameter associated with said aircraft, a further transmitter, and means for tuning said further transmitter to a frequency bearing a predetermined relation with the frequency of tuning of said receiver.

20. A system of communication comprising a transmitter at a first location, a receiver at said first location, means for tuning said transmitter and said receiver to frequencies having a fixed difference of frequency and for controlling said frequencies in accordance with a value of a variable measurable quantity, a further transmitter, and means for tuning said further transmitter to a frequency bearing a predetermined relation with the frequency of tuning of said receiver.

21. A system of communication comprising a transmitter, a receiver, means for tuning said transmitter and receiver in accordance with a value of a quantity, a remote transmitter, means for tuning said first mentioned transmitter to a frequency bearing a predetermined relation with the frequency of tuning of said receiver, and means for automatically maintaining the tuning of said further transmitter in fixed relation with respect to the frequency of said receiver.

22. A system of communication comprising a transmitter aboard an aircraft, a receiver aboard said aircraft, means for tuning said transmitter and receiver to frequencies having a fixed frequency difference and for selecting said frequencies in accordance with a value of a navigational parameter associated with said aircraft, a further transmitter, and means for tuning said further transmitter to a frequency bearing a predetermined relation with the frequency of tuning of said receiver and for automatically maintaining the tuning of said further transmitter at a frequency bearing a predetermined relation with respect to the frequency of tuning of said receiver during variations of said last mentioned tuning.

23. A system of communication comprising a transmitter aboard an aircraft, a receiver aboard said aircraft, means for tuning said transmitter and said receiver to frequencies having a fixed difference of frequency and for controlling said frequencies in accordance with a value of a variable measurable quantity, a further transmitter, means for tuning and maintaining tuned said further transmitter to a frequency bearing a predetermined relation with the frequency of tuning of said receiver, said last means comprising a further receiver responsive to signals transmitted by said transmitter aboard an aircraft, means for maintaining an adjustable difference of tuning between said further receiver and said further transmitter, and means for maintaining the tuning of said further receiver equal to the tuning of said transmitter aboard an aircraft.

24. A communication system comprising an airborne transmitter, an airborne receiver, a ground transmitter, a ground receiver, means maintaining a fixed frequency difference between the tuning of said ground transmitter and receiver, means maintaining a like fixed frequency difference between the tuning of said airborne receiver and transmitter, means for automatically tuning said airborne transmitter in accordance with the altitude of said airborne receiver, and means for continuously synchronizing the tuning of said ground transmitter with said airborne receiver and of said airborne transmitter with said ground receiver.

25. A communication system comprising a first transmitter, a first receiver, a second transmitter, a second receiver, means maintaining a fixed frequency difference between the tuning of said second transmitter and receiver, means maintaining a like fixed frequency difference between the tuning of said first receiver and transmitter, and means for automatically continuously synchronizing the tuning of said second transmitter with said first receiver, and of said first transmitter with said second receiver.

26. A communication system comprising a vehicle borne transmitter, a vehicle borne receiver, a second transmitter, a second receiver, means maintaining a fixed frequency difference between the tuning of said second transmitter and said second receiver, means maintaining a like frequency difference between the tuning of said vehicle borne receiver and said vehicle borne transmitter, and means for synchronizing the tuning of said second transmitter with said vehicle borne receiver and of said vehicle borne transmitter with said second receiver.

27. A communication system comprising a vehicle borne transmitter, a vehicle borne receiver, a further transmitter, a further receiver, means maintaining a fixed frequency difference between the tuning of said further transmitter and said further receiver, means maintaining a like fixed frequency difference between the tuning of said vehicle borne receiver and said vehicle borne transmitter, means for determining the tuning of said vehicle borne transmitter in accordance with the value of a variable parameter associated with said vehicle, and means for automatically maintaining synchronism between the tuning of said further transmitter with said vehicle borne receiver and of said vehicle borne transmitter with said further receiver during variation of said parameter.

28. A system of communication comprising a local receiver, means for maintaining the tuning of said local receiver in accordance with the value of a measurable quantity, a remote transmitter, and means for maintaining the tuning of said remote transmitter at a frequency bearing constantly a selectively predetermined relation with the frequency of tuning of said local receiver.

29. A system of communication comprising a tunable receiver, a tunable transmitter remotely located with respect to said receiver, and means responsive to variation of tuning of said receiver for retuning said remote transmitter to a frequency bearing a predetermined relation with the frequency of tuning of said receiver.

30. A communication system comprising an airborne transmitter, an airborne tunable receiver, a tunable ground transmitter, a tunable ground receiver, means maintaining a fixed frequency difference between the tuning of said ground transmitter and receiver, means maintaining a like fixed frequency difference between the tuning of said airborne receiver and transmitter, means for varying the frequency of said airborne transmitter and receiver, and means for maintaining the tuning of said ground transmitter selectively at a predetermined frequency difference from the tuning of said ground receiver during variation of tuning of said airborne receiver.

31. Apparatus for establishing a radio blind landing path comprising a tunable radio transmitter, means for establishing a predetermined time law of variation of tuning of said transmitter, said law bearing a fixed relation with a desired law of variation of aircraft altitude with time during a landing procedure.

32. Apparatus for establishing a radio blind landing path comprising a tunable radio transmitter, means for establishing a predetermined time law of variation of tuning of said transmitter, said law bearing a fixed relation with a desired law of variation of aircraft altitude with range from a predetermined location during a landing procedure.

33. Apparatus for establishing a radio blind landing path for aircraft comprising a tunable transmitter located at a ground station adjacent to said radio glide path, means for establishing a predetermined law of variation of the tuning of said transmitter, said law bearing a fixed relation with a desired path of an aircraft in landing, a radio receiver aboard said aircraft for receiving signals provided by said tunable transmitter, means for tuning said receiver in accordance with the altitude of said aircraft, and means comprising said radio receiver aboard said aircraft for continuously indicating aboard said aircraft the difference of tuning of said receiver with respect to tuning of said transmitter.

34. A method of guiding an aircraft to a landing comprising transmitting for each distance of the aircraft from a predetermined location a frequency corresponding with a desired altitude of said aircraft, receiving said signals aboard said aircraft, and comparing said received frequency with the altitude of said aircraft.

35. In a navigational system, means for measuring range of an elevated remote object from a predetermined location, a transmitter for transmitting signals, a receiver aboard said elevated object for receiving said signals, means at said transmitter responsive to said means for measuring range for imposing on said signals a frequency characteristic representative of a desired altitude for each distance of said elevated object as measured by said means for measuring range, said receiver aboard said aircraft comprising means for interpreting said distinguishing characteristic in terms of said desired altitude.

36. A navigational system for an elevated vehicle comprising a receiver located aboard said vehicle and tuned in accordance with the altitude of said vehicle, said receiver comprising means for indicating a frequency difference between the tuning of said receiver and the frequency of signals received by said receiver, and remote transmitter means for transmitting signals having frequencies controllable within the acceptance band of said receiver.

37. In a navigational system for aircraft, means for transmitting a signal having an information bearing characteristic representative of a desired modification of altitude of an aircraft, means aboard said aircraft for receiving said signal and for translating said information bearing characteristic into an indication of the character of said desired modification of altitude, means responsive to a modification of altitude of said aircraft in correspondence with said desired modification of altitude for providing a modification of of said information bearing characteristic to indicate a further desired modification of altitude of said aircraft.

38. In a navigational system for aircraft, means for transmitting a signal having an information bearing characteristic representative of deviation of said aircraft from a predetermined altitude, means for transmitting a further signal having an information bearing characteristic representative of deviation of said aircraft from a predetermined bearing, means aboard said aircraft for receiving said signals and for translating said signals into a composite visual indication of said deviations.

39. In a navigational system for guiding a vehicle, means remote from said vehicle for determining a first navigational parameter defining a component of position of said vehicle, means responsive to said first named means for generating a signal having an information bearing characteristic representative of a desired value of a second navigational parameter for said vehicle, means for transmitting said signal to said vehicle, means for determining aboard said vehicle an actual value of said second navigational parameter for said vehicle, and means aboard said vehicle for providing an indication of the relative values of said desired and actual values of said second navigational parameters.

40. In a navigational system for guiding an aircraft, means remote from said vehicle for measuring range of said aircraft, means responsive to said first named means for generating a signal having an information bearing characteristic representative of a desired value of altitude for said aircraft for the measured range, means for transmitting said signal to said vehicle, and means aboard said vehicle for translating said signal into an indication of the deviation of the altitude of said aircraft from said desired value of altitude.

41. In a navigational system for guiding an aircraft, means remote from said aircraft for measuring a first navigational parameter relating to said aircraft, means for generating a signal in response to said first means having an information bearing characteristic determined in accordance with said first navigational parameter representative of a desired value of a second and different navigational parameter, means for transmitting said signal to said aircraft, and means aboard said aircraft for translating said signal into an indication of the value of said second and different navigational parameter.

42. An obstacle detection system comprising a receiver mounted in an aircraft, means for tuning said receiver in accordance with the altitude of the aircraft, a transmitter located in proximity to an obstacle, means for frequency modulating said transmitter over a predetermined range of frequencies and at a predetermined rate, and means for selecting said range of frequencies in accordance with the elevation of said obstacle.

43. The combination in accordance with claim 28, wherein is further provided means for locally indicating said predetermined relation in response to signal derived from said local receiver.

44. The combination in accordance with claim 28 wherein said last means comprises a tunable local transmitter, means for maintaining a fixed difference in tuning between said local transmitter and said local receiver, a remote receiver for receiving signals transmitted by said local transmitter, said remote receiver comprising means for maintaining tuning of said remote receiver at a predetermined frequency difference from said remote transmitter and for varying said frequency difference at will.

45. The combination in accordance with claim 28 wherein said last means comprises: a tunable local transmitter, means for maintaining a fixed difference in tuning between said local transmitter and said local receiver, a remote superheterodyne receiver having an intermediate frequency amplifier, for receiving signals transmitted by said local transmitter, said remote superheterodyne receiver and said remote transmitter having a common local oscillator and master oscillator to control the frequencies of tuning thereof, said remote superheterodyne receiver comprising means for maintaining tuning of said remote superheterodyne receiver at a predetermined frequency difference from said remote transmitter and for varying said frequency difference at will, said last means comprising means for varying the frequency of said intermediate frequency amplitude.

46. The combination in accordance with claim 28 wherein said last means comprises a local transmitter, means for maintaining a fixed difference of tuning between said local transmitter and said local receiver, and wherein said means for maintaining the tuning of said remote transmitter at a frequency bearing constantly a selectively predetermined relation with the frequency of tuning of said local receiver comprises a tunable frequency discriminator responsive to the frequency of transmission of said local transmitter to provide a control signal for controlling the tuning of said remote transmitter, and means for varying the tuning of said frequency discriminator at will.

47. The combination in accordance with claim 29 wherein is provided means for selecting said predetermined relation at will.

MARCEL WALLACE.

REFERENCES CITED

The following references are of record in the file of this patent:

UNITED STATES PATENTS

| Number | Name | Date |
|---|---|---|
| Re. 21,660 | Armstrong | Dec. 17, 1940 |
| 2,027,527 | Hammond | Jan. 14, 1936 |
| 2,042,490 | Zahl | June 2, 1936 |
| 2,062,003 | Hammond | Nov. 24, 1936 |
| 2,090,359 | Robinson | Aug. 17, 1937 |
| 2,097,072 | Lock | Oct. 26, 1937 |
| 2,209,273 | Hills | July 23, 1940 |
| 2,248,215 | Budenbom | July 8, 1941 |
| 2,252,083 | Luck | Aug. 12, 1941 |
| 2,372,620 | Williams | Mar. 27, 1945 |
| 2,378,604 | Wallace | June 19, 1945 |
| 2,395,854 | Ferrill | Mar. 5, 1946 |
| 2,400,232 | Hall | May 14, 1946 |
| 2,403,603 | Korn | July 9, 1946 |
| 2,405,239 | Seeley | Aug. 6, 1946 |
| 2,408,791 | Magnuski | Oct. 8, 1946 |
| 2,413,620 | Guanella | Dec. 31, 1946 |
| 2,436,846 | Williams | Mar. 2, 1948 |
| 2,439,663 | Lewis | Apr. 13, 1948 |
| 2,459,482 | Bond | Jan. 18, 1949 |